United States Patent Office 3,377,141
Patented Apr. 9, 1968

3,377,141
PROCESS FOR PRODUCING METAL CARBIDES UTILIZING A SOLUTION TREATMENT PRIOR TO REACTION
John F. Hardy, Andover, and Merrill E. Jordan, Walpole, Mass., assignors to Cabot Corporation, Boston, Mass., a corporation of Delaware
No Drawing. Filed Aug. 26, 1964, Ser. No. 392,284
16 Claims. (Cl. 23—345)

This invention relates to a process for producing metallurgical powders. More precisely, the invention disclosed herein relates to an improved process for producing finely-divided metal carbide powders of submicron dimensions.

Finely-divided metal carbide powders are well known products of commerce. Such products presently have many known specialized applications and their potential applications are regarded as especially promising. Many processes are known for producing metal carbide powders and in general, the fineness of the ultimate powder is primarily determined by the process utilized. For example, the most finely-divided carbide powders such as those having average particle diameters below about one micron are generally produced by reacting metal oxides with carbon and thereafter subdividing the resulting carbide by highly specialized attrition processes. Accordingly, the most finely-divided metal carbides are rather expensive because of the intricate processes involved in producing them. In view of the growing interest in finely-divided metal carbide powders, especially those having average particle diameters below about 0.1 micron, any process whereby such products can be produced in a simple and inexpensive fashion would indeed be a notable contribution to the art.

A principal object of the present invention is to provide an improved process for making the foregoing contribution to the art.

A more specific object of the present invention is to produce metal carbides in a finely-divided form in an extremely economical fashion.

Another object of the present invention is to provide a process for producing combinations of metal carbides in a finely-divided form and varying amounts of carbon which combinations have specialized properties and are of particular utility as fillers and/or as pigments in elastomeric and plastomeric compositions.

Another object of the present invention is to provide an improved process for producing metal/metal carbide mixtures.

Other objects and advantages of the present invention will in part be obvious to those well skilled in the art and will in part appear hereinafter.

In a very broad sense, the above-mentioned objects and advantages are realized in accordance with the practice of our invention by mixing a finely-divided carbon black and a metal compound in a fashion which insures an especially uniform and intimate association of the ingredients at the time the resulting mixture is introduced into a high temperature environment suitable for converting the metal compound to the corresponding carbide. More precisely, the advantages which flow from the practice of our invention are realized by combining the ingredients under conditions which will insure that the ingredients will be uniformly associated with each other in a discrete generally sub-micron state. Thus, our invention resides not only in the ingredients and the form thereof utilized but also in the manner of intimately combining said ingredients to produce a carbon black/metal compound mixture which can be subsequently treated to convert said compound to the carbide in an extremely finely-divided powder form wherein the particles in most cases have average particle diameters below about 0.5 micron and often between about 0.02 and about 0.06 micron.

The manner of combining the carbon black and the metal compound is considered especially critical since this factor contributes significantly to the reduced temperatures and shorter reaction times involved in converting the compound to the ultimate metal carbide powder. We are unable to explain precisely why our manner of combining said ingredients is so advantageous. However, we have found pronounced differences in the physical properties of intermediate mixtures similar to ours but which have been produced by combining the starting ingredients in a different manner. More specifically, we have found that the X-ray diffraction patterns of our uniform mixtures of carbon black and metal compound differ quite distinctly from those of identical mixtures not obtained in accordance with the teachings of our invention. The most striking difference between said patterns is that the crystallinity of our mixture is greatly suppressed. We consider this reduced or suppressed crystallinity to be a significant factor.

The advantages in the use of lower temperatures and/or shorter reaction times in producing finely-divided metal carbides will be obvious to those skilled in the art. For example, lower temperatures and shorter residence times of reactants in a conversion zone obviously imply many economic advantages in both the design of apparatus and operation. Even more importantly, lower temperatures and shorter times minimize sintering which has long been a serious problem in converting metal compounds to fine particle sized end products. Accordingly, we are enabled to present a highly versatile and an especially simple and economical process for producing diverse metal carbides and mixtures thereof in an extremely finely-divided form, thereby eliminating the elaborate and expensive attrition techniques required heretofore in the production of carbides.

In accordance with a preferred embodiment of our invention, a soluble or dispersible metal compound is dissolved or uniformly dispersed in a slurry or dispersion of carbon black and the resulting dispersion is thereafter spray dried to produce extremely uniform dry particles.

Spray drying is quite different from conventional drying processes. For example, conventional drying of mixtures of a metal compound and carbon black proceeds by way of evaporation of the liquid from the surface of the presscake and the continuous replacement of this surface water by capillary movement of moisture from the internal portions thereof. Such uneven drying normally gives rise to agglomerates which are non-uniform in both size and composition. In spray drying, however, evaporation takes place from small uniform droplets surrounded by warm gases. Under such conditions, the resulting dry particles are normally relatively uniform in size and equally importantly have a uniform composition. In existing commercial spray drying equipment, the powdered product obtained by spray drying a solution or slurry is normally characterized by uniform spherical particles which are usually of a hollow or porous nature and of uniform particle size. In general, the average particle size of the dried product ranges between about 20 and about 60 microns. The relatively small particle size of the spray dried product is another factor which is considered important. A more complete description of the details of commercial spray drying systems can be found in "Design and Use of Spray Dryers," pages 83–88 of Chemical Engineering, Sept. 30, 1963. It is to be understood however, that the practice of our invention is not restricted solely to the processes and apparatus set forth in the aforesaid article. Instead, by "spray drying," we mean—and intend to include within the scope of the present invention—those drying processes wherein a slurry is subdivided into, and maintained as, discrete, preferably uniform droplets while conducted through a zone heated to a temperature sufficient to dry same; especially included are those drying processes in which the average particle size of the dried product is no greater than about 200 microns.

Broadly, the metal compounds that can be utilized in the practice of our invention include the compounds of such metals as tungsten, molybdenum, chromium, vanadium, boron, thorium, aluminum, titanium, silicon, zirconium, tantalum, hafnium, uranium, niobium, and mixtures of these. In general, any compound of these metals including the sulfates, halides, nitrates, nitrites and acetates, which can be converted to the corresponding metal carbide by reaction with carbon is suitable for our purposes. Especially preferred, however, are the water soluble or water dispersible organic and inorganic salts or complex salts of the above-mentioned metals.

For the purposes of the present specification, and the claims attached hereto, carbon black refers generally to products produced by the incomplete combustion and/or pyrolysis of hydrocarbon materials. Thus, for example, materials referred to in the art as acetylene blacks, lamp blacks, channel blacks, thermal blacks, etc., are all included within the scope of the present invention.

In addition to functioning as a reactant, the presence of carbon black also contributes to the lower conversion temperatures and shorter reaction times realized in accordance with our invention. Also, the use of carbon black permits one to conveniently apply the practice of our invention to the production of metal carbide compositions containing selected amounts of carbon.

The exact amount of carbon black to be combined with the metal compounds will be determined primarily by the amount of carbon desired in the final composition. We consider our process most valuable when applied to the production of finely-divided metal carbide compositions of high purity, that is to say, metal carbide compositions containing very small quantities of carbon black, i.e., containing less than about 10% by weight of the total composition of carbon black. Accordingly, in the most preferred embodiment of our invention, the amount of black utilized initially will rarely exceed the amount required to produce compositions comprising about 10% by weight carbon black.

However, it is to be understood that our process can also be applied to the production of finely-divided metal carbide compositions comprising larger amounts of carbon black. Such compositions can be utilized as fillers in elastomeric or plastomeric compositions and accordingly can contain up to about 90% by weight of carbon black if desired.

The practice of our invention also includes the preparation of a finely-divided metal carbide essentially free of carbon. This is best accomplished by mixing the metal compound with an amount of carbon black approximately equivalent to the stoichiometric amount required to convert the metal compound to the carbide. Excess carbon in the resulting product can be reduced by treating the product with steam, for example.

The temperature at which the metal compound in our carbon black/metal compound intermediate mixtures can be converted to the corresponding carbide can vary over a wide range. In general, the range includes temperatures substantially below those normally required to convert the metal compound to the carbide as well as temperatures that can exceed said normal conversion temperatures by 400 or 500° C. and even more. The lower temperatures are of special utility when the conversion is achieved by way of batch type process. However, a more efficient method of thermally converting the metal compound to the corresponding carbide is by way of a continuous process in which the dry particles comprising carbon black and metal compound are conveyed while suspended in a fluid medium through a high temperature conversion zone. In such continuous processes, it is obviously desirable to reduce residence time to a minimum and thus the temperature of the conversion zone will be relatively high.

The conditions existing in the conversion zone at any given time will be determined by many factors such as the amount of carbon black present, the conversion temperature utilized, the environment and the particular metal compound involved. For example, if the ultimate product is to be a carbide of high purity (i.e. low carbon black content) then a reducing environment is preferred. An inert atmosphere is often suitable when the conversion temperature is closely controlled and maintained below or at about the normal conversion temperature of the compound.

The following specific examples of a particular embodiment of our invention are given for the purposes of providing a fuller and more complete understanding of some of the operating details of the invention together with many of the advantages to be obtained from practicing same. These examples should be considered as illustrative only and as in no sense limiting the scope of the present invention.

Example 1 which follows demonstrates the criticality of our manner of combining the ingredients. It is to be understood that although only zirconium acetate is utilized in this example, nevertheless the advantages illustrated are normally achievable with other metal compounds:

Example 1

This example illustrates the criticality in the manner of combining the metal compounds and the carbon black. Vulcan 3, an oil furnace carbon black, was mixed with zirconium acetate in the manners described in Table I below: The amount of carbon black in each of the following mixtures was 25% by weight of the mixture.

TABLE I

| Mixture No. | Ingredients | Method of Forming Mixture |
|---|---|---|
| 1 | Zirconium acetate and carbon black. | Zirconium acetate solution mixed with slurry of black and evaporated to dryness—"Crystallization Technique." |
| 2 | do | Zirconium acetate solution mixed with slurry of black and spray dried; average particle size of spray dried product was >44 microns—"Spray Drying Technique." |

Portions of each of the above mixtures were heat treated at 1000° C. in the absence of air in an induction furnace for periods of 60 minutes and subsequently at 1800° C. for 15 minutes. X-ray diffraction patterns were obtained on each of the resulting compositions and the patterns were examined for the presence of zirconium carbide. The following data was obtained:

TABLE II

| Mixture No. | Technique | X-Ray Diffraction Data, percent ZrC |
|---|---|---|
| 1 | Crystallization | 50 |
| 2 | Spray Drying | 95 |

Table II demonstrates that our manner of combining the ingredients permits conversion of the metal compound to the corresponding metal carbide substantially more quickly; thus in addition to obvious economic avantages, our manner tends to produce a product having a lower average particle diameter than can normally be obtained by other methods, since opportunities for sintering of the product are greatly minimized.

Substantially the same results and benefits illustrated in the preceding example are obtained when other metal compounds and other carbon blacks are utilized. Thus, the practice of the present invention is usually applicable to the production of finely-divided metal carbides of boron, thorium, aluminum, titanium, silicon, tantalum, uranium, hafnium, niobium and mixtures of any of these, The following examples are offered to illustrate the application of the teachings of our invention to the production of other finely-divided metal carbides.

Example 2

This example illustrates a manner of producing a composition containing boron carbide and carbon black. Such a composition is useful as a filler in various elastomeric or plastomeric materials for specialized applications.

A water solution of ammonium pentaborate was well mixed with an aqueous dispersion of Sterling MT, a medium thermal carbon black, and the resulting mixture was spray dried. The spray dried product consisted of 75% by weight ammonium pentaborate and 25% by weight Sterling MT.

The spray dried product was then heat treated in an induction furnace under an inert atmosphere for varying periods of time and at various temperatures. For this purpose, the induction furnace was modified to permit "dunking" a graphite crucible, containing a sample, into the preheated heating zone. The crucible could be withdrawn from the heating zone at will.

X-ray diffraction patterns were obtained for each heat treated sample. These patterns were then examined for boron carbide content. The following data was obtained:

TABLE III

| Temperature (° C.) | Heating Time (mins.) | Boron Carbide Content (percent) |
| --- | --- | --- |
| 1,600 | 40 | 34.3 |
| 1,800 | 10 | 26.5 |
| 1,800 | 20 | 40.0 |

Example 3

Considerable attention has been given to the production of a −325 mesh aluminum carbide. For example, such a product has been found to be an effective catalyst in the production of methane gas by hydrolysis. The product also has additional applications as a deodorizer, alloying agent and as a chemical intermediate. This example illustrates a manner of producing such a finely-divided aluminum carbide in accordance with the practice of our invention.

Aluminum sulfate is dissolved in water and mixed with an aqueous dispersion of carbon black. The amount of carbon black is approximately stoichiometrically sufficient to react with the aluminum sulfate to produce aluminum carbide. The mixture of carbon black and aluminum sulfate is then spray dried and the resulting powder is heated in an induction furnace at a temperature of about 1800° C. for about 120 minutes. The resulting product is a finely-divided aluminum carbide.

Example 4

100 lbs. of ammonium metatungstate is dissolved in 25 gallons of water. 20 lbs. of Vulcan 3 is dispersed into the tungstate solution and the resulting mixture is spray dried. Thereafter the spray dried product is heated to a temperature of about 1500° C. for about 30 minutes. The resulting product consists primarily of tungsten carbide in a finely-divided form.

It will be obvious from the preceding examples that the process of our invention is highly versatile and can be applied to the production of many metal carbide products of commercial interest. However, many modifications can be introduced in many of the features utilized in illustrating our invention without departing from the spirit and scope thereof.

For example, while it is generally desirable to mix the carbon black and the metal compound into a liquid medium and subdivide the resulting dispersion into discrete droplets for drying, it is obvious that when the carbon black and metal compound are mixed so that the resulting mixture is initially in the form of discrete droplets, further subdivision is entirely unnecessary and the step of "subdividing" can be entirely eliminated.

Also, the present process lends itself well to the production of free metal/metal carbide mixtures. Thus, by providing a mixture which comprises in addition to carbon black and a metal compound that can be converted by reaction with carbon to the corresponding metal carbide, a compound of a metal such as nickel, iron and cobalt which can be converted to the free metal by reaction with carbon, there are produced in accordance with the present invention free metal/metal carbide mixtures containing selected amounts of carbon black or if desired entirely free of carbon black. There follows an illustrative example:

Example 5

An aqueous solution containing 10 lbs. of ammonium metatungstate, 2 lbs. of Vulcan 3, and an aqueous solution containing 95 lbs. of nickel sulfate are thoroughly mixed and the resulting mixture is spray dried. Thereafter the spray dried product is heated to a temperature of about 1800° C. for 60 minutes. The resulting product consists of a mixture of nickel metal, tungsten carbide and carbon.

Further details relating to the reaction of nickel, iron, and cobalt compounds with carbon to produce the free metal can be found in our copending application U.S. Ser. No. 387,223, now abandoned, filed Aug. 3, 1964.

It is to be understood that the proportion of free metal to metal carbide in the final composition can be selectively adjusted to conform to a wide range of specifications. For example, compositions of the present invention comprising metal and metal carbide containing less than about 15% by weight metal carbide can be regarded as dispersion strengthened alloys. Also compositions of metal and metal carbide containing between about 1 and about 50% by weight metal can be fabricated into articles known to the art as cemented carbides.

Having described our invention together with preferred embodiments thereof, what we declare as new and desire to secure by U.S. Letters Patent is as follows:

1. A process for producing finely-divided metal carbides and mixtures thereof comprising the steps of:
   (a) uniformly mixing into a liquid medium
      (1) a metal compound which can be converted to the corresponding metal carbide by reaction with carbon, and
      (2) carbon black,
   (b) spray drying the resulting mixture, and
   (c) heating the resulting particles in the absence of substantial amounts of oxygen to a temperature sufficient to convert said metal compound to the corresponding metal carbide and below the sintering temperature of said metal carbide.

2. The process of claim 1 wherein said metal compound is chosen from the group consisting of the compounds of tungsten, molybdenum, chromium, vanadium, boron, thorium, aluminum, titanium, silicon, zirconium, tantalum, hafnium, uranium, niobium and mixtures of these.

3. The process of claim 1 wherein said metal compound is a boron compound.

4. The process of claim 1 wherein said metal compound is an aluminum compound.

5. The process of claim 1 wherein said metal compound is a titanium compound.

6. The process of claim 1 wherein said metal compound is a tungsten compound.

7. The process of claim 1 wherein said metal compound is a thorium compound.

8. The process of claim 1 wherein said metal compound is water soluble.

9. The process of claim 1 wherein said metal compound is chosen from the group consisting of sulfates, nitrates, acetates, and chlorides.

10. The process of claim 1 wherein a mixture of metal compounds is utilized.

11. The process of claim 1 wherein the dry particles produced in accordance with step (b) have an average particle diameter of less than about 200 microns.

12. The process of claim 1 wherein the dry particles produced in accordance with step (b) have an average particle diameter of less than about 60 microns.

13. The process of claim 1 wherein step (c) is accomplished in an inert atmosphere.

14. The process of claim 1 wherein step (c) is accomplished in a reducing atmosphere.

15. The process of claim 1 wherein said compound is an inorganic compound and the amount of carbon black utilized in step (a) is approximately equivalent to the stoichiometric amount required to convert said compound to the corresponding metal carbide.

16. The process of claim 1 wherein the quantity of carbon black utilized in step (a) is such that the resulting metal carbide/carbon black composition comprises less than about 10% by weight carbon black.

References Cited

UNITED STATES PATENTS

| | | | |
|---|---|---|---|
| 2,733,134 | 1/1956 | Aagaard | 23—208 |
| 3,004,832 | 10/1961 | Aagaard | 23—208 |
| 3,171,715 | 3/1965 | Kleinsteuber | 23—14.5 |
| 3,331,783 | 7/1967 | Braun et al. | 23—345 |

OTHER REFERENCES

Schwarzkopf et al.: Refractory Hard Metals, New York, 1953, The MacMillan Co., p. 49 (TN677S36C.3).

CARL D. QUARFORTH, *Primary Examiner.*

BENJAMIN R. PADGETT, L. DEWAYNE RUTLEDGE, *Examiners.*

S. TRAUB, M. J. McGREAL, *Assistant Examiners.*